Sept. 14, 1943.  H. ALLEN  2,329,315
VALVE
Filed Sept. 25, 1941  2 Sheets-Sheet 1
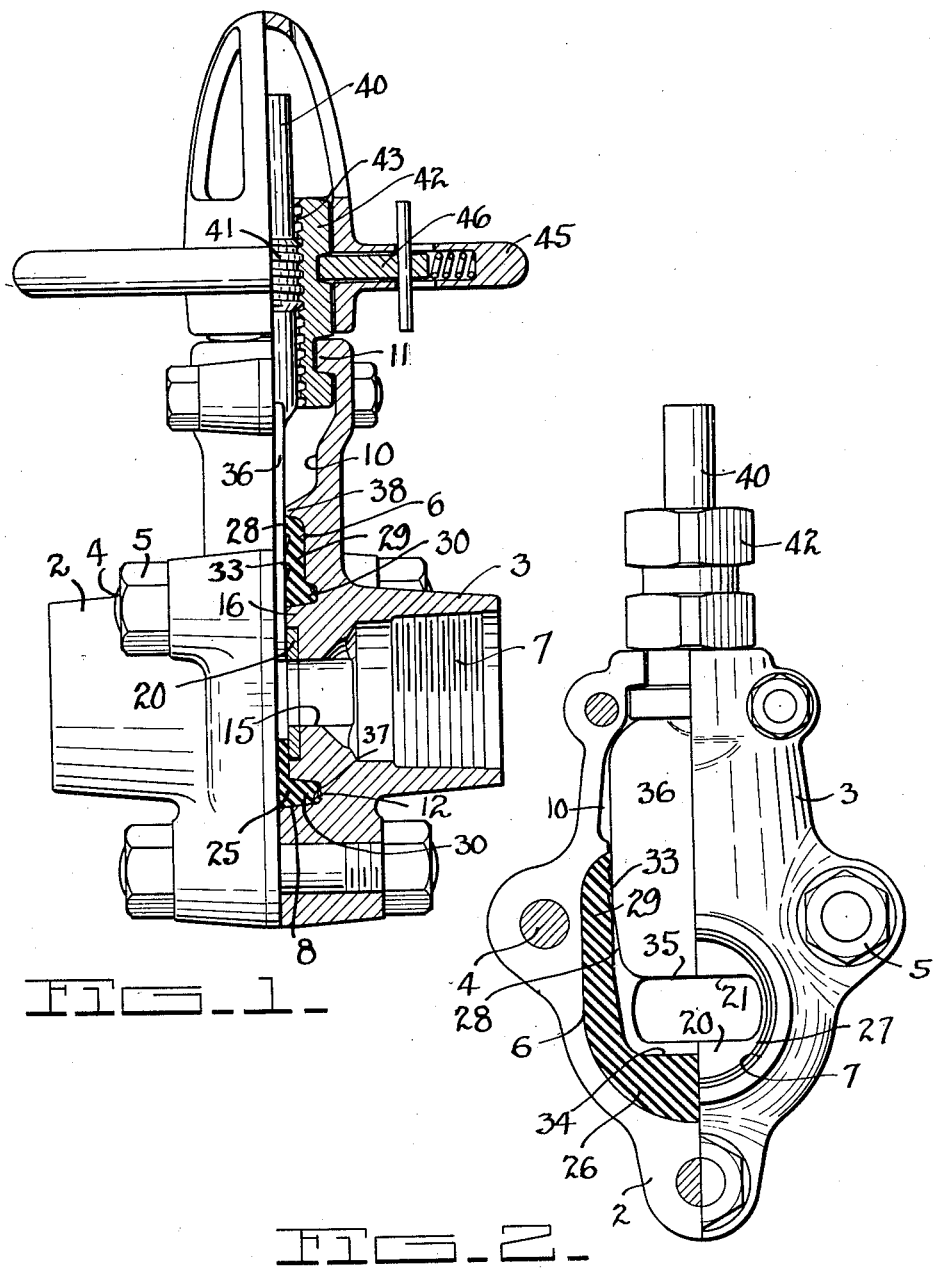
HERBERT ALLEN
INVENTOR
BY Lester B. Clark.
ATTORNEY.

Sept. 14, 1943.  H. ALLEN  2,329,315
VALVE
Filed Sept. 25, 1941  2 Sheets-Sheet 2
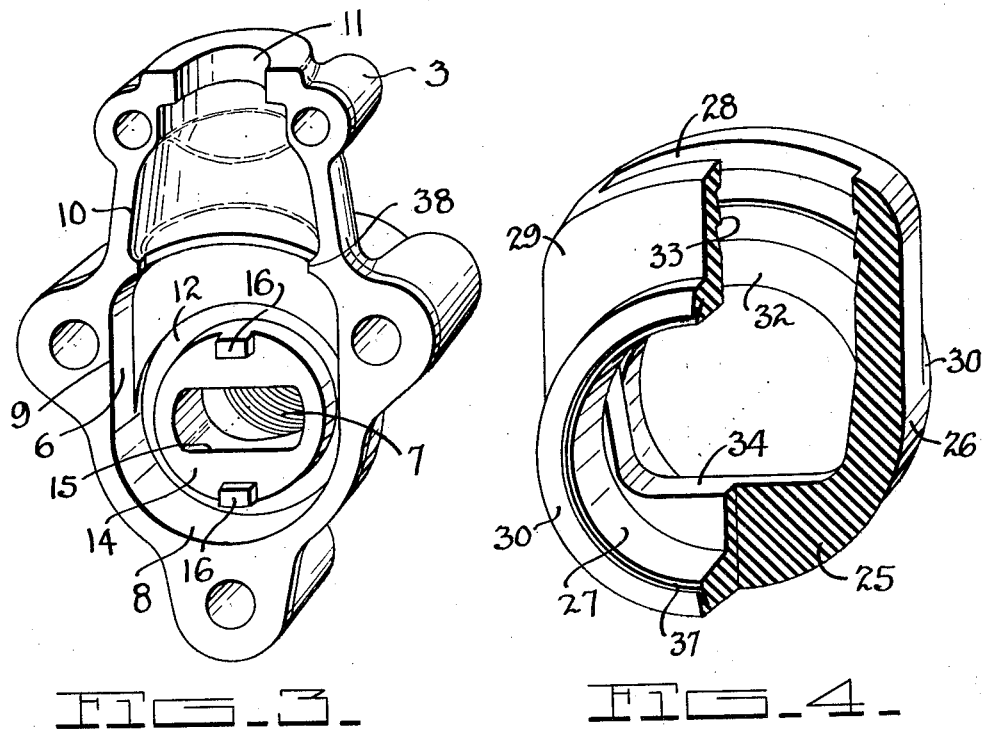
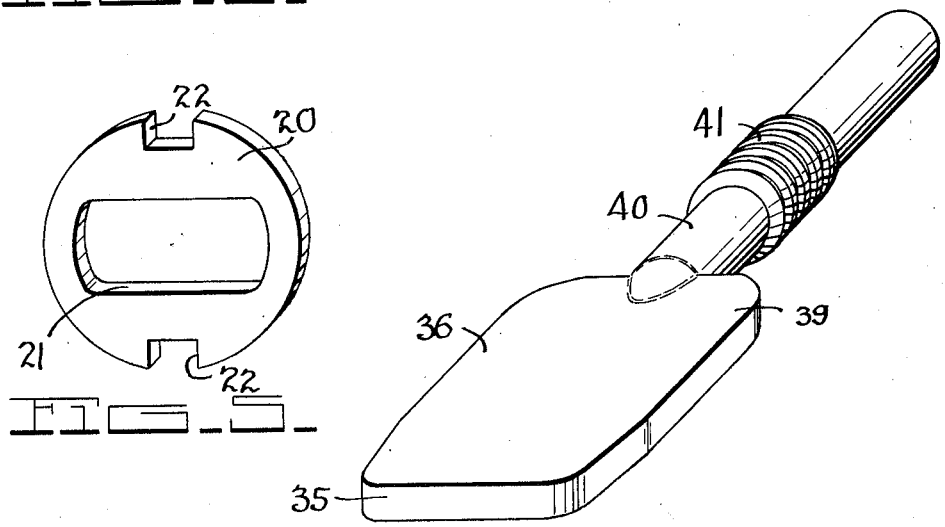
HERBERT ALLEN
INVENTOR
BY Lester B. Clark.
ATTORNEY.

Patented Sept. 14, 1943

2,329,315

UNITED STATES PATENT OFFICE 2,329,315

VALVE

Herbert Allen, Houston, Tex., assignor to Cameron Iron Works, Houston, Tex.

Application September 25, 1941, Serial No. 412,242

1 Claim. (Cl. 251—156)

The invention relates to a valve and packing therefor, and particularly to a split housing type of manifold or gate valve.

The general type of valve here involved is shown in the prior patents to Allen et al. 2,194,262 and 2,194,263 issued March 19, 1940, wherein separate packings are provided for the gate and the stem or the packing is extended upwardly around the stem. In the present application, however, the packing is a combined packing for both the gate and the stem and is clamped between the split portions of the housing so that it is readily replaceable by the insertion of a single packing element.

It is one of the objects of the invention to provide a split type housing gate valve wherein a unitary resilient sealing portion is provided but wherein the gate member is adapted to abut against a wear-resistant surface.

Another object of the invention is to provide a removable wear-resistant surface in a gate valve in combination with a resilient packing to seal around the closure member about said surface.

Another object of the invention is to provide a particular type of packing member for gate valves wherein the member is compressed by the closing action of the gate member and thereby forced to seal about the gate member.

Another object of the invention is provide a unitary resilient packing member to be clamped between the portions of a split housing gate valve so as to provide a seal about the gate member.

Other and further objects of the invention will be readily apparent when considered in connection with the following description and the accompanying drawings wherein:

Fig. 1 is an edge elevation of the valve embodying the invention with one portion thereof shown in section;

Fig. 2 is an end elevation with certain portions thereof in section;

Fig. 3 is a perspective view of the inner portion of one of the housing parts;

Fig. 4 is a perspective view of the resilient packing with certain portions shown in section;

Fig. 5 is a perspective view of the wear-resistant seat;

Fig. 6 is a perspective view of the gate member or spade.

Fig. 1 shows the valve as being made up of a pair of housing members 2 and 3 which are complementary and arranged to be clamped together by the thru bolts 4 and the nuts 5.

Each of these housings has a central chamber 6 therein, as seen in Fig. 3, and this chamber joins the longitudinal passage 7, which is the flow passage through the valve. The chamber 6 is of peculiar construction, having a curved base 8 and the vertical side portions 9. The upper end opens into an enlarged portion 10 which in turn terminates in a neck area 11.

An annular groove 12 defines one end of the recess and it will be observed that this recess encircles the flow passage 7. Projecting into the chamber 6 about the flow passage is an extension 14 which has a substantially rectangular opening 15 therein and upper and lower lugs 16 extending therebeyond.

A wear-resistant plate 20 is seen in Fig. 5 and it will be noted that it has an opening 21 therein which corresponds to the opening 15 in the body and has slots 22 which are arranged to fit over the lugs 16. This plate is shown in position in Fig. 1.

In order to provide a seal for the valve to prevent leakage from the passage 7, a packing element 25 has been provided and is seen in perspective in Fig. 4. This packing is made up of a body of suitable resilient material 26 having an axial passage 27 therethrough. This passage is, in turn, joined by an opening 28 leading in through the neck portion 29.

This body will be placed in between the valve portions 2 and 3 and the valve in this manner assembled by drawing the two halves together tightly. The resilient packing 25 is in this manner clamped in the chamber made by the two recesses 6. The annular ring-like ends 30 of the packing member fit into the annular grooves 12, and the projection 14 fits into the ends of the passage 27, as seen in Fig. 1. The side face 32 of the packing is substantially flush with the face of the wear-resistant ring 20, as will be seen in Fig. 1.

This face carries a plurality of lips 33 which are arranged to resist the flow of pressure upwardly inside of the neck 29. It will be noted that the bottom of the recess 28 is flattened at 34 to receive the lower end 35 of the gate 36. It will also be noted that the packing completely encircles the projection 14 and that it is confined at its upper end by the shoulder 38 at the upper end of the recess 6. In this manner, as the gate member 36 is forced into the recess 28, a seal will be formed about the gate member by the neck portion 29. When the gate member is forced firmly against the lower surface 34 it seems clear that the resilient material of the packing will permit it to flow under such pressure and inasmuch as the packing is completely confined, any desired pressure may be established therein with a view of maintaining a predominant pressure in the packing to prevent leakage. A lip 37 may also be provided in each end portion 30 to seal with the housing.

The pressure applied to the face 34 of the packing will tend to force the packing upwardly around the gate member and cause the neck portion, and particularly the lips 33, to form a seal with the upper portion of the gate member.

In this manner it seems apparent that a complete seal has been provided entirely around each of the flat edges of the gate 36 about the longitudinal passage, and in view of the fact that a complete seal is formed about the top 39 of the gate member, it seems apparent that no additional packing is needed about the gate member. Thus, the single packing element serves as a combination stem and gate packing.

In order to manipulate the gate 36 a stem 40 is provided thereon carrying a threaded area 41. A bushing 42 is clamped in place by the neck portion 11 of the valve and is rotatable relative to the valve member. This bushing is internally threaded at 43 to receive the threads 41 so that a rising stem valve is provided. A removable handle or wheel portion 45 can be adjustably clamped by the latch 46 on the bushing 42 when it is desired to manipulate the valve.

Broadly, the invention contemplates a combined stem and gate packing wherein a seal is maintained about the flow passage when the valve is open and completely around the gate member when the valve is closed.

What is claimed is:

In a split housing type gate valve, a split housing, a gate member, a gate chamber formed by the housing, seating faces projecting into said chamber for engagement with the opposite sides of said gate, and a unitary sealing member having a body portion disposed in said chamber encircling said seating faces and adapted to be engaged by said gate member as it moves to closed position, and a neck portion to engage the gate in all positions, said sealing member being resilient so as to flow under the pressure of the gate member when in closed position, said neck portion having a sealing lip engaging said gate in all positions.

HERBERT ALLEN.